United States Patent [19]

Wiegand

[11] 4,405,276
[45] Sep. 20, 1983

[54] APPARATUS FOR UNSTACKING PLANKS

[75] Inventor: Karl-Wolfram Wiegand, Bochum, Fed. Rep. of Germany

[73] Assignee: Dimter GmbH Maschinenfabrik, Illertissen, Fed. Rep. of Germany

[21] Appl. No.: 272,205

[22] Filed: Jun. 10, 1981

[30] Foreign Application Priority Data

Jul. 14, 1980 [DE] Fed. Rep. of Germany ....... 3026613

[51] Int. Cl.³ ............................................. B65G 59/02
[52] U.S. Cl. ...................................... 414/119; 271/42
[58] Field of Search ............... 414/112, 117, 118, 119; 271/42, 128, 130

[56] References Cited

U.S. PATENT DOCUMENTS

| 256,511 | 4/1882 | Stillwell | 414/124 |
| 3,565,266 | 2/1971 | Buss | 414/118 |

FOREIGN PATENT DOCUMENTS

| 2551846 | 6/1977 | Fed. Rep. of Germany | 414/117 |
| 215683 | 9/1967 | Sweden | 414/118 |
| 623799 | 9/1978 | U.S.S.R. | 271/128 |
| 670517 | 7/1979 | U.S.S.R. | 414/119 |
| 734106 | 5/1980 | U.S.S.R. | 414/117 |

Primary Examiner—Leslie J. Paperner
Attorney, Agent, or Firm—Staas & Halsey

[57] ABSTRACT

Apparatus for unstacking planks from a stack with a traverser truck equipped with cams movable over the entire length of the stack. In each case the top layer of the stack can be raised to a predetermined working level, wherein the cams can then be moved up and down with a lifting unit arranged on the traverser truck. The cams are movably secured in the vertical direction relative to the lifting unit. A plant holding down device extending in the feed direction is pivotally connected to the cam and resiliently supported from the lifting unit.

5 Claims, 2 Drawing Figures

APPARATUS FOR UNSTACKING PLANKS

BACKGROUND OF THE INVENTION

The present invention relates to an apparatus for unstacking planks with a traverser truck equipped with cams able to move over the length of the stack. The top layer of the stack or pile of planks or boards can be raised to a predetermined working level.

The most varied equipment is known for unstacking and separating stacks of planks. Such stacks of planks must be separated in order to be able to individually supply the planks to further processing means. The planks are stacked either with or without intermediate stacking strips or supports. The sizes and cross-sections of the planks vary widely. As the planks are relatively long, but not always identical they are subject to warping and twisting, so that their edges are not always precisely located in one plane.

BRIEF SUMMARY OF THE INVENTION

The object of the invention is to provide an apparatus of the aforementioned type permitting universal use and which operates without difficulty even if the plank edges, which are to be displayed by the cams, are not at a height or level which can be precisely determined.

This object of the invention is achieved in that the cams can move up and down with a lifting unit positioned on the traverser truck and are movably secured in the vertical direction with respect to the lifting unit.

Advantageously, the apparatus can be constructed in such a way that a holding down device extending in the feed direction is articulated to each cam and is resiliently supported on the lifting unit.

The apparatus according to the invention makes it possible to adjust the cams fitted in the vertical direction relative to the traverser truck to the plank edges to be taken up. Although in principle the plank edges are raised to a common working height, they are not precisely in one plane therein. In the case of long and rough-worked planks, which also project to a greater or lesser extent, there are normally warping and twisting effects, so that the plank edge which is to be displaced is not located precisely at the level of the plank plane, e.g., it can be higher or lower. The movable arrangement of the cams and also the provision of resiliently mounted holding down devices permits a flexible adaptation, so that there is no danger of an incorrect displacement.

BRIEF DESCRIPTION OF THE DRAWINGS

The invention is described in greater detail hereinafter relative to a non-limitative embodiment and the attached drawings, wherein.

DETAILED DESCRIPTION OF THE PREFERRED EMBODIMENTS

Figure 1:
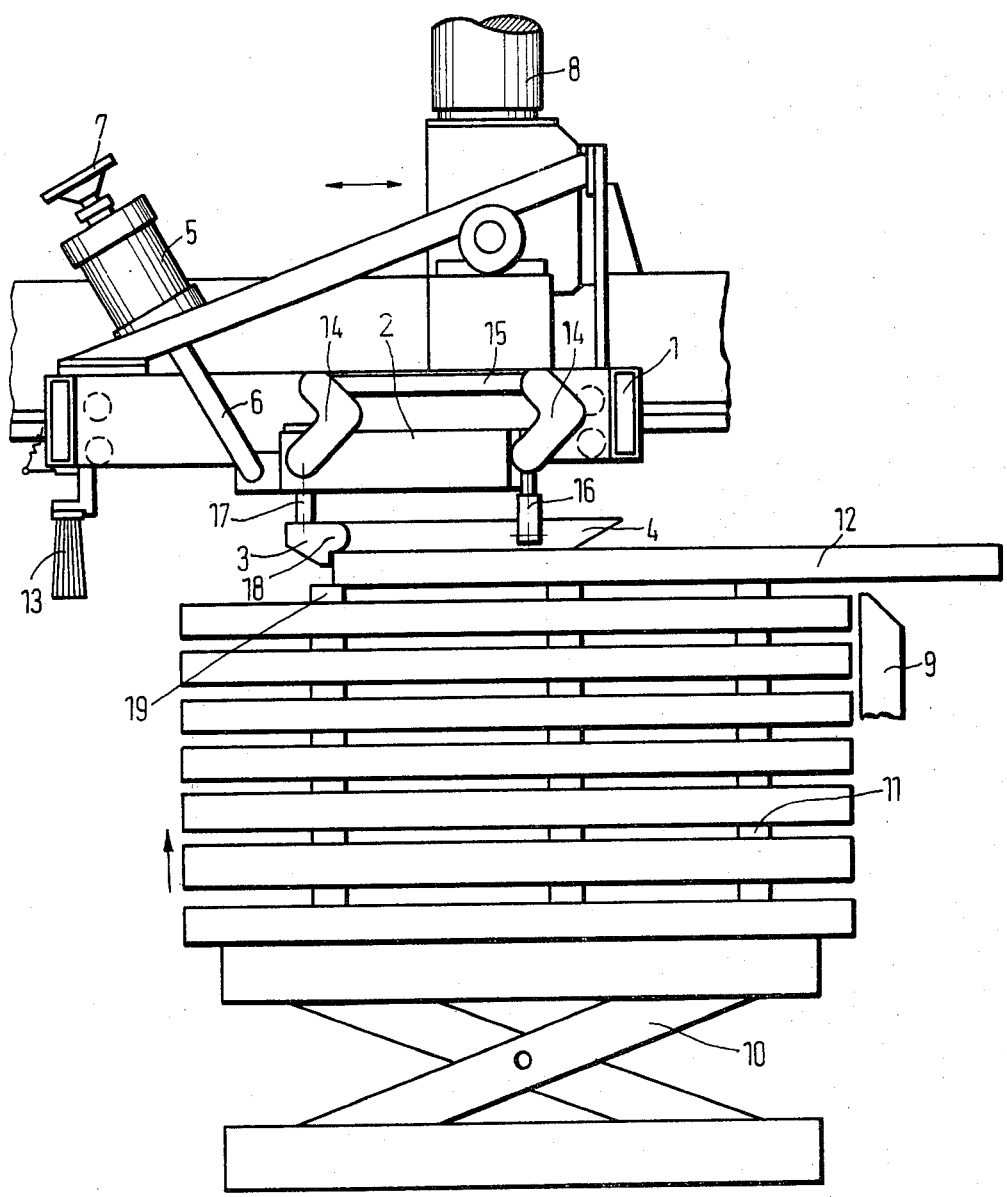
FIG. 1 is a diagrammatic side view of an embodiment of an apparatus according to the invention.

The apparatus shown in the drawings comprises a displacer truck 1 formed on the not shown machine frame and which is movable in a not shown linear guide over the entire length of the stack or pile. By operating limit switches, the initial position is adapted to the stack length. The driving action is provided by an electric motor 8 via a gear.

A lifting unit 2 is fixed to the traverser truck 1 with the aid of toggle levers 14 and piston and cylinder units 5 and 6 in such a way that it can move up and down. The lower end of each toggle lever 14 is articulated to the lifting unit. The two upper ends of the corresponding toggle levers are interconnected by a rod, whose length can be adjusted. The toggle levers are articulated to the traverser truck 1. Piston rod 6 is fixed to lifting unit 2 and cylinder 5 to traverser truck 1.

In order to adjust the height position of the lifting unit, so as to adapt to the thickness of the planks to be unstacked a threaded spindle 6 is provided in the through piston rod of the cylinder unit. The lower edge of the top layer fundamentally defines the working level.

A plurality of cams 3 is fixed to lifting unit 2 in a particular area so as to be movable up and down. Bolt 17 moves up and down with the associated cams 3. Each cam has a downwardly directed driving edge.

An elongated holding down device 4 projecting in the feed direction is articulated at 18 to each cam. By means of a compression spring the holding down device 4 is biased in the direction of the plank stack 11 supported on the lifting unit.

A back stop 9 projects approximately up to the working level.

Brushes 13 are provided on the traverser truck for removing any stack strips or supports which may be provided and which are designated by reference numeral 19 in FIG. 1.

Device 10, which may for example be hydraulically operated, ensures that the stack of planks always assumes the desired operating level and one plank layer 12 can be moved past the back stop 9.

Figure 2:
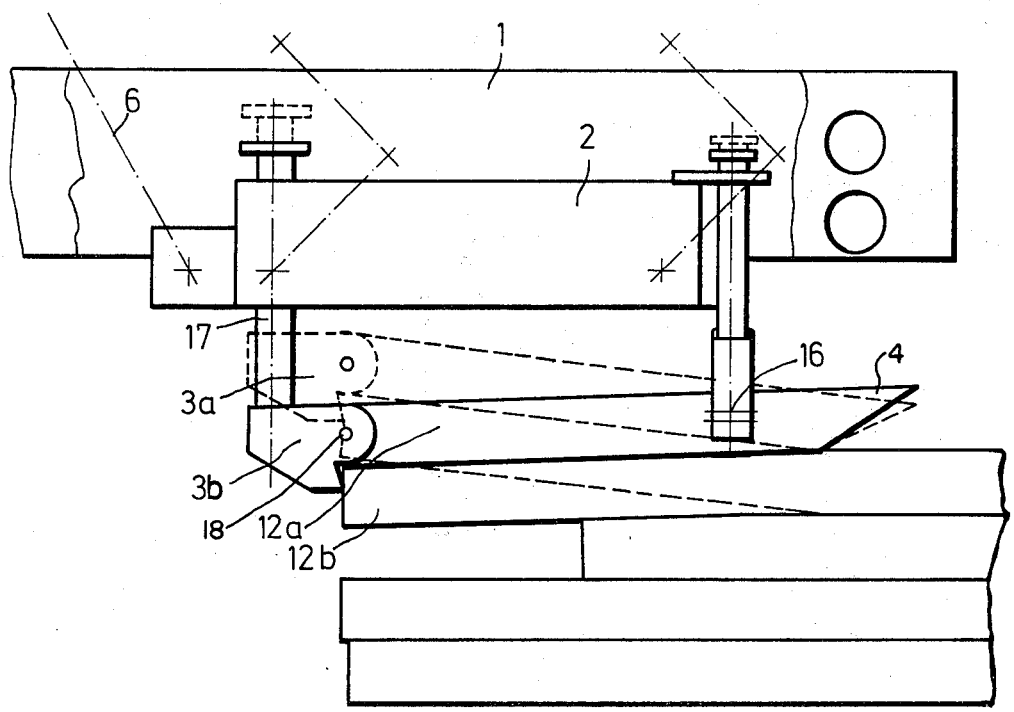
FIG. 2 is a partial detailed side view of the apparatus embodiment taken from FIG. 1.

In operation the traverser truck is moved into its starting position, i.e. to the far left, in FIG. 1. The stack is brought to the appropriate level by lifting unit 2. By extending piston rod 6 the lifting unit 2 is then lowered, the toggle levers 14 performing a corresponding movement. The individual cams 3 move downwards until they engage with a plank positioned below them. The cams can in each case assume different positions because bolts 17 permit a relative vertical movement with respect to lifting unit 2, as illustrated in FIG. 2. Position 3b is assumed if a plank 12b has assumed a relatively pronounced downward curve. Position 3a is assumed if a plank 12a has a corresponding upward projection. The holding down devices 4 articulated to each cam at 18 are pressed on to the corresponding surface of the associated plank by the associated compression spring 16 and consequently reliably prevent any upward movement.

The traverser truck is now moved over the length of the stack and one layer is moved beyond the back stop 9. This layer is subsequently separated into individual planks in a corresponding apparatus.

By retracting piston rod 6 the lifting unit is then raised, so that an unimpeded movement back into the starting position is possible. Simultaneously, device 10 is used to raise the complete stack of planks by one plank thickness. The aforementioned process is repeated after the traverser truck 1 has returned to the starting position.

What is claimed is:

1. An apparatus for unstacking planks from a stack comprising:

(a) a traverser truck;
(b) a lifting unit arranged on the traverser truck for supporting a stack of planks thereon;
(c) means for raising the top layer of the plank stack to a predetermined working level;
(d) cams operatively connected to said lifting unit, the cams being moveable over the entire length of the stack and moveable vertically relative to the lifting unit; and
(e) holding down devices resiliently supported on the lifting unit and extending in the plank feed direction, the holding down devices being pivotally connected to corresponding cams for movement relative to said cams and against the top layer of the plank stack.

2. The apparatus of claim 1, wherein the holding down devices are spring-biased in the direction of the plank stack.

3. The apparatus of claim 2, further comprising interconnected toggle levers for moveably connecting the lifting unit to the traverser truck and piston and cylinder means connected to said lifting unit and traverser truck for moving said lifting unit up and down.

4. An apparatus according to claim 3, wherein each piston and cylinder unit is adjustable for the height adjustment of the lifting unit.

5. An apparatus according to claim 3 further comprising brushes acting at the working level and provided on the traverser truck.

* * * * *